(12) United States Patent
Guillemin

(10) Patent No.: US 7,447,764 B2
(45) Date of Patent: Nov. 4, 2008

(54) PERIPHERAL DEVICES, SYSTEMS FOR PROVIDING JOB OPERATIONS FOR A PLURALITY OF HOST DEVICES, AND PERIPHERAL DEVICE MONITORING METHODS

(75) Inventor: Gustavo Guillemin, Guadalajara (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 10/260,781

(22) Filed: Sep. 27, 2002

(65) Prior Publication Data

US 2004/0064547 A1 Apr. 1, 2004

(51) Int. Cl.
*G06F 15/173* (2006.01)
*G06F 9/46* (2006.01)

(52) U.S. Cl. .................. 709/224; 709/226; 718/102

(58) Field of Classification Search .......... 709/224, 709/226
See application file for complete search history.

(56) References Cited

U.S. PATENT DOCUMENTS

| | | | |
|---|---|---|---|
| 5,119,126 A | 6/1992 | Tokuda | |
| 5,499,707 A | 3/1996 | Steury | |
| 5,559,933 A * | 9/1996 | Boswell | 358/1.15 |
| 5,729,598 A | 3/1998 | Kay | |
| 5,754,655 A | 5/1998 | Hughes et al. | |
| 5,787,149 A | 7/1998 | Yousefi et al. | |
| 5,956,487 A | 9/1999 | Venkatraman et al. | |
| 6,026,380 A | 2/2000 | Weiler et al. | |
| 6,044,138 A | 3/2000 | Graham et al. | |
| 6,292,267 B1 * | 9/2001 | Mori et al. | 358/1.15 |
| 6,416,270 B1 | 7/2002 | Steury et al. | |
| 6,801,926 B1 * | 10/2004 | Shisler et al. | 709/201 |
| 6,822,754 B1 * | 11/2004 | Shiohara | 358/1.15 |
| 7,019,861 B2 * | 3/2006 | Aagesen | 358/1.15 |
| 2001/0036866 A1 | 11/2001 | Stockdale et al. | |
| 2002/0140959 A1 * | 10/2002 | Harper | 358/1.13 |
| 2003/0140095 A1 * | 7/2003 | Simpson et al. | 709/203 |

* cited by examiner

*Primary Examiner*—John B. Walsh

(57) ABSTRACT

Peripheral devices, systems for providing job operations for a plurality of host devices, and peripheral device monitoring methods are described. According to one embodiment, a peripheral device monitoring method includes interfacing a plurality of different host devices with a peripheral device at a plurality of different moments in time, receiving, by the peripheral device, a plurality of job requests from the host devices, receiving, by the peripheral device, a plurality of identifiers from the host devices, performing, by the peripheral device, a plurality of job operations in response to the job requests, and communicating, by the peripheral device, a plurality of messages regarding the job operations and the identifiers to a monitoring device.

45 Claims, 5 Drawing Sheets

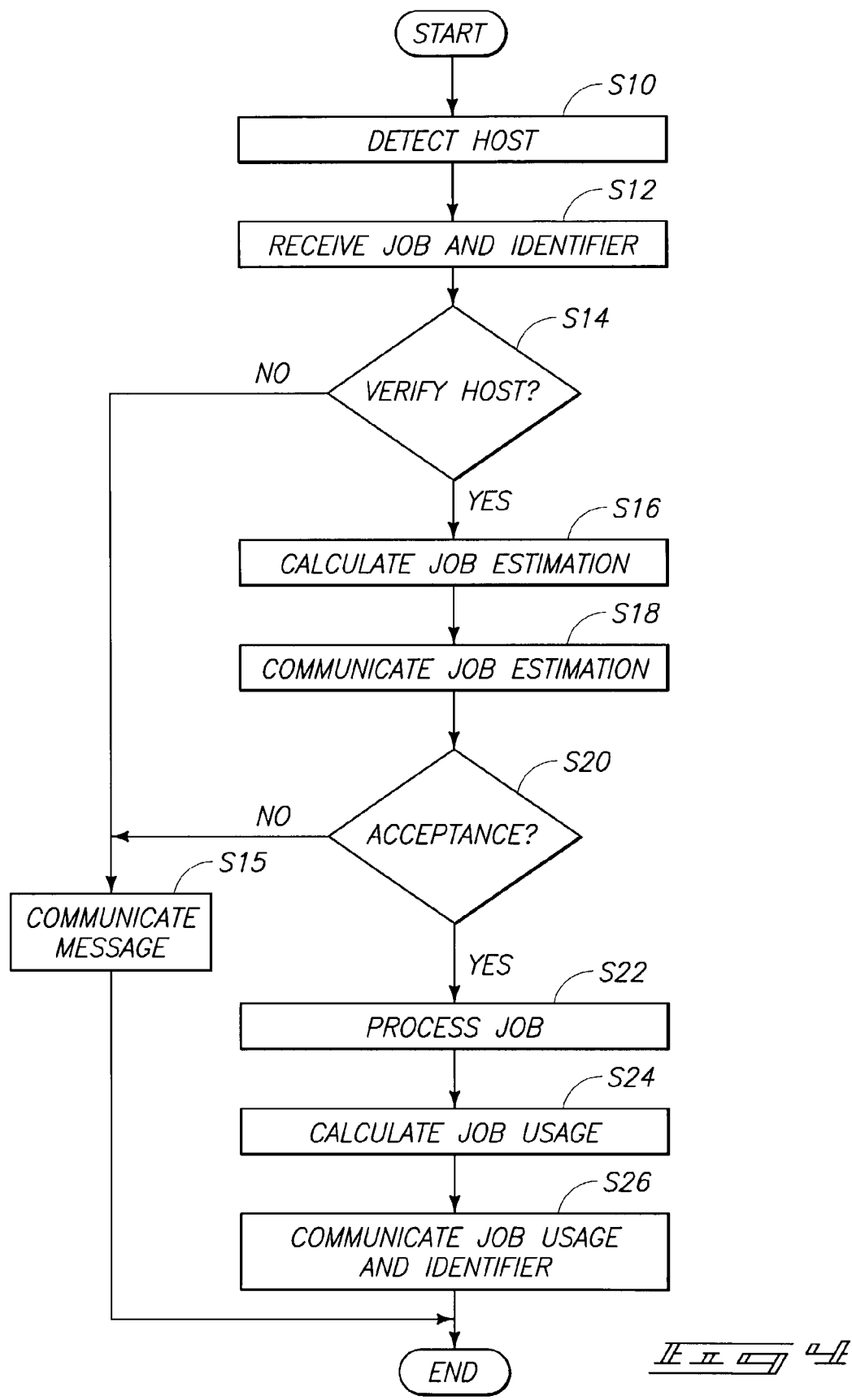

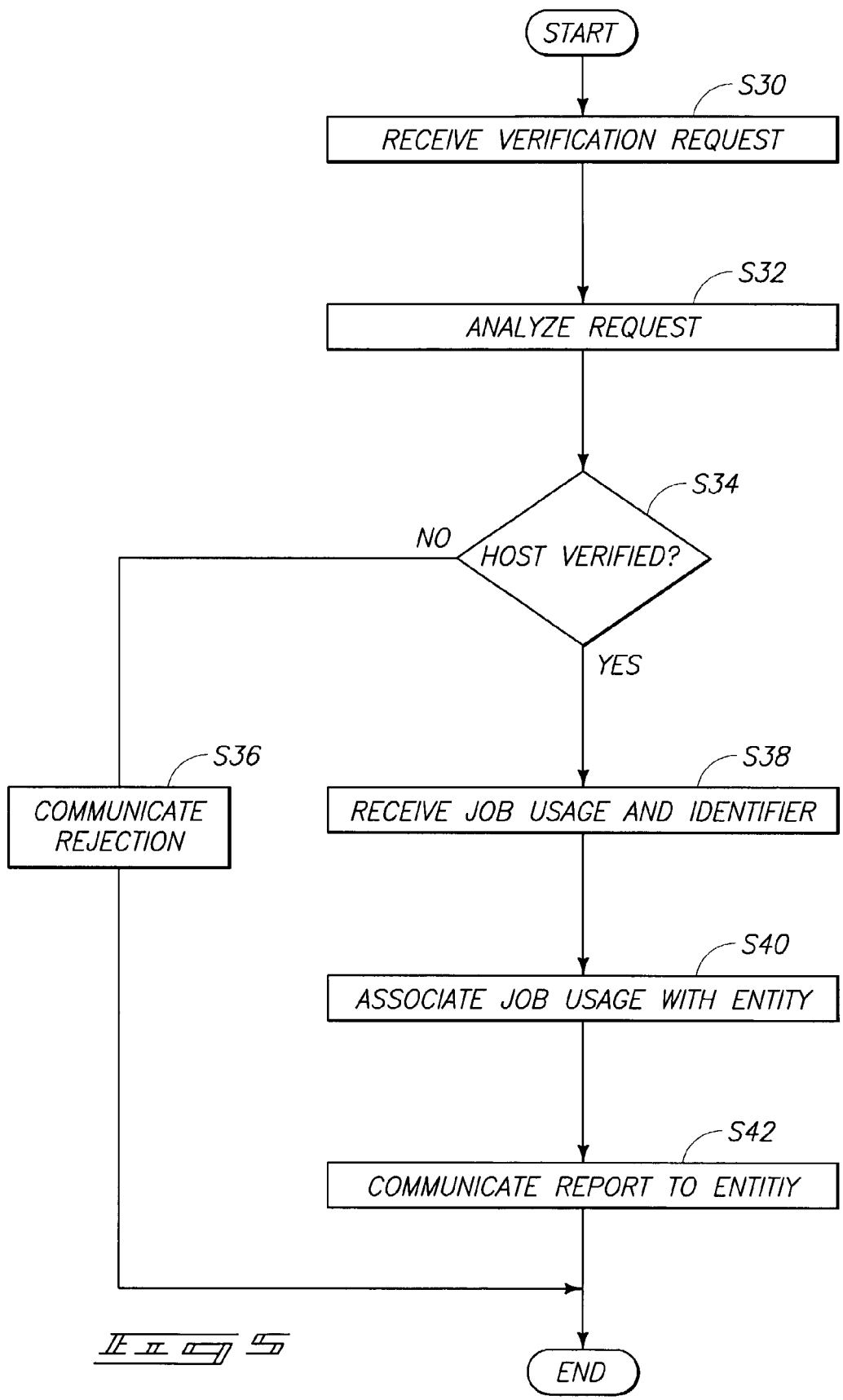

PERIPHERAL DEVICES, SYSTEMS FOR PROVIDING JOB OPERATIONS FOR A PLURALITY OF HOST DEVICES, AND PERIPHERAL DEVICE MONITORING METHODS

BACKGROUND OF THE INVENTION

Processing and computing devices are ubiquitous in work environments, educational environments, and other areas. More recently, processing and computing devices of enhanced capabilities have been embodied as portable units (e.g., notebook computers) offering processing and computing services to individuals away from the office, school or home. It is now commonplace for employees, students and other users to travel with processing and computing devices to access e-mail, work intranets, entertainment services, or for other reasons.

In some areas frequently accessed by travelers, such as hotels, airports, bus terminals, etc., printing devices may be provided and used by travelers desirous of printing jobs from their associated processing and computing device. In some applications, usage of the printer is absorbed by the provider of the printer, or alternatively, an employee or other individual monitors usage of the printer, accepts a credit card or other means of payment from the individual, and generates a bill to charge the individual for the services. Such applications have associated drawbacks including loss of potential revenue to cover overhead for the printing device, requirements of additional staffing to monitor usage of the printing device, etc.

DESCRIPTION OF THE DRAWINGS

FIG. 4 is a flow chart of an exemplary methodology executable by a peripheral device.

FIG. 5 is a flow chart of an exemplary methodology executable by a monitoring device.

DETAILED DESCRIPTION

Figure 1:
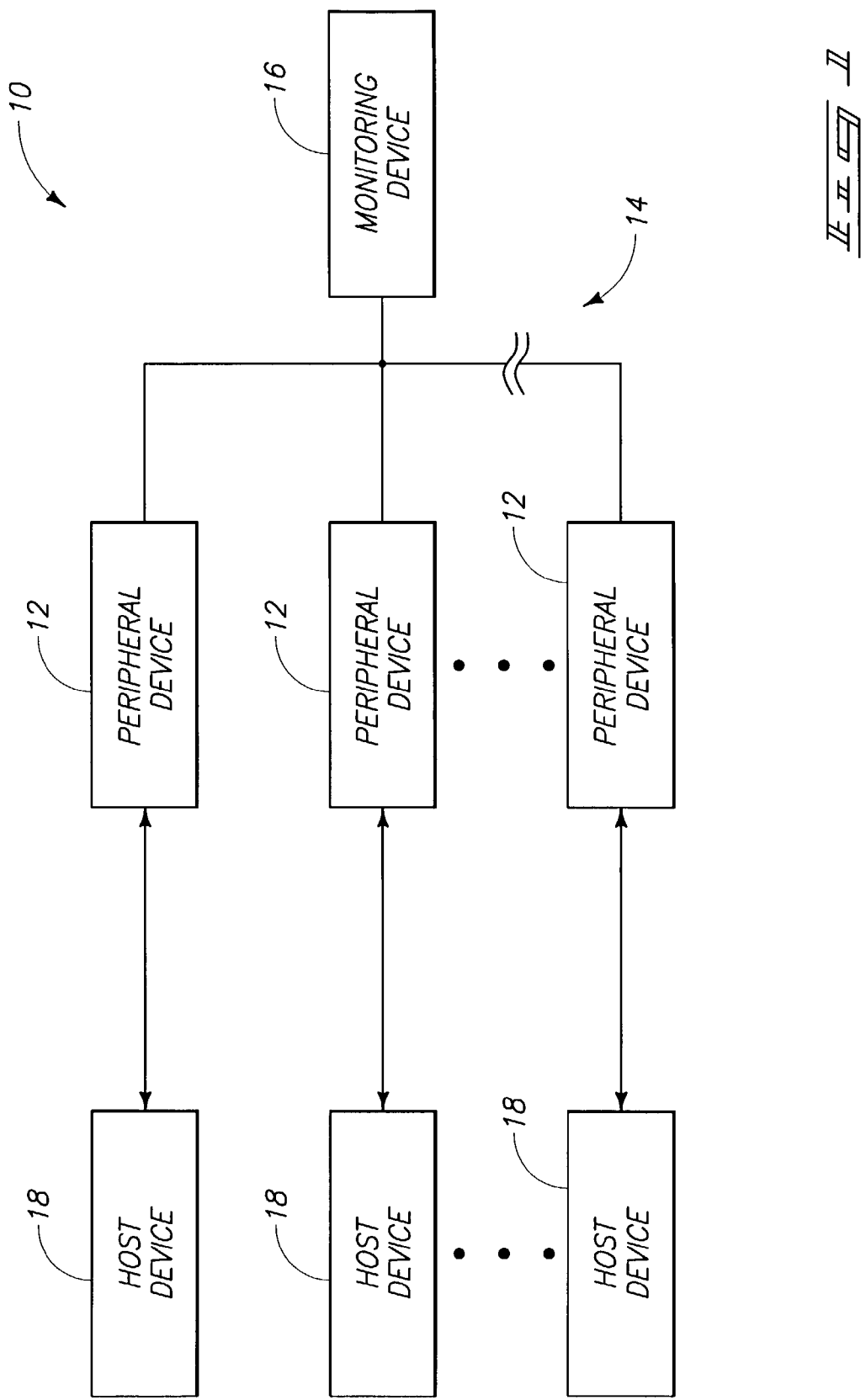
FIG. 1 is a functional block diagram of an exemplary system of distributed peripheral devices.

According to one embodiment of the invention, a peripheral device configured to perform job operations with respect to a plurality of host devices comprises communications circuitry adapted to couple with a plurality of different host devices at a plurality of different moments in time, to receive a plurality of different identifiers of the respective host devices, and to receive a plurality of job requests to initiate performing of job operations with respect to the host devices, wherein the communications circuitry is further adapted to couple with a monitoring device, a job operator configured to perform the job operations, and processing circuitry configured to monitor the performing of the job operations with respect to the host devices using the job operator, to formulate a plurality of messages relative to the performing the job operations using the job operator, to associate the identifiers with the respective messages corresponding to the respective host devices, and to control the communications circuitry to communicate the identifiers and the respective messages to the monitoring device for preparation of a plurality of reports to indicate information associated with the performing the job operations and communication of the reports to a plurality of entities associated with respective ones of the host devices.

According to another embodiment of the invention, a peripheral device comprises communication means for coupling with a plurality of different host devices at a plurality of different moments in time, to receive a plurality of different identifiers of the respective host devices, and to receive a plurality of job requests, wherein the communication means further comprises means for coupling with a monitoring device, job operator means for performing a plurality of job operations with respect to the host devices responsive to the job requests, and processing means for monitoring the job operator means, for formulating a plurality of messages relative to the performing of the job operations, for associating the identifiers with the respective messages corresponding to the respective host devices, and for controlling the communication means to communicate the identifiers and the messages to the monitoring device for preparation of a plurality of reports to indicate usage information associated with the performing the job operations and communication of the reports to a plurality of entities associated with respective ones of the host devices.

According to still another embodiment of the invention, a system for providing job operations to a plurality of host devices comprises a plurality of peripheral devices individually configured to couple with a plurality of host devices at a plurality of different moments in time, to receive a plurality of identifiers of the respective host devices, to perform job operations with respect to the host devices, and to communicate a plurality of messages regarding the performing the job operations and identifying the host devices, and a monitoring device coupled with the peripheral devices and configured to receive the messages regarding the performing the job operations and identifying the host devices, to associate the messages with a plurality of entities associated with respective ones of the host devices, and to communicate a plurality of respective reports regarding the performing the job operations with respect to the host devices.

According to yet another embodiment of the invention, a peripheral device monitoring method comprises interfacing a plurality of different host devices with a peripheral device at a plurality of different moments in time, receiving, by the peripheral device, a plurality of job requests from the host devices, receiving, by the peripheral device, a plurality of identifiers from the host devices, performing, by the peripheral device, a plurality of job operations in response to the job requests, and communicating, by the peripheral device, a plurality of messages regarding the job operations and the identifiers to a monitoring device.

Referring to FIG. 1, an exemplary system 10 is illustrated. The depicted system 10 includes a plurality of peripheral devices 12, a network 14 and a monitoring device 16. Network 14 may be embodied as a public and/or private network arranged to communicate information and data between peripheral devices 12 and monitoring device 16. In one arrangement, network 14 is arranged to implement packet-switched communications using internet protocol (IP) communications (e.g., the Internet). Other communication protocols may be utilized.

The depicted system 10 includes a plurality of peripheral devices 12 for illustration purposes. In other arrangements, system 10 may include a single peripheral device 12. Individual peripheral devices 12 are arranged to interface with a plurality of host devices 18 at a plurality of moments in time as described further below. Peripheral devices 12 may be located at strategic or convenient locations which are frequented by users of host devices 18 who desire usage of resources of peripheral devices 12. For example, one or more of the peripheral devices 12 may be located at airports, hotels, bus terminals, etc. wherein users of host devices 18 may wish to have access to peripherals. In other applications, peripheral devices 12 may be provided to accommodate a group of associated individuals, for example, employed by a corporation. The described applications are exemplary and the peripheral devices 12 may be provided in any other application or environment wherein use of services of the peripheral devices 12 is desired.

Exemplary peripheral devices 12 provide operations with respect to host devices 18. For example, peripheral devices 12 may be embodied as printers, scanners, facsimile devices, copiers, multi-function devices, compact disk writers, or in other configurations capable of implementing operations with respect to host devices 18. Exemplary operations include print operations, scanning operations, fax operations, copying operations, CD write operations, etc.

The depicted peripheral devices 12 may be located at positions remote from one another and/or from monitoring device 16. In other arrangements, a plurality of peripheral devices 12 may be positioned adjacent to one another to offer simultaneous use by a plurality of host devices 18, to offer a plurality of different operations to a single host device 18, or for other reasons.

Host devices 18 may be implemented in exemplary configurations as processing or computing devices, including for example, laptop or notebook computers, personal digital assistants (PDAs), electronic gaming devices, mobile appliances, portable phones, etc. Exemplary host devices 18 are arranged to forward job requests to peripheral devices 12 to initiate performing of job operations by the peripheral devices 12 with respect to the requested jobs.

As described further below, exemplary embodiments of the invention provide system 10, including one or more peripheral device 12 and monitoring device 16, arranged to receive jobs from host devices 18, to provide usage estimation information for the received jobs to host devices 18, to provide verification of host devices 18, to monitor usage of peripheral devices 12, to provide tracking and communication of usage information of peripheral devices 12, and/or to facilitate billing or otherwise indicate usage information of peripheral device 12 to entities associated with host devices 18. Exemplary entities associated with host devices 18 include owners of host devices 18, employers of users of host devices 18, etc.

Peripheral devices 12 and host devices 18 may communicate using any appropriate interface. For example, peripheral devices 12 and host devices 18 may individually include an infrared port, universal serial bus (USB) port, serial port, parallel port or other configuration for implementing bi-directional data transfer.

During typical usage, a host device 18 connects to or otherwise interfaces with a respective peripheral device 12. Following connection, host device 18 accesses or utilizes services of peripheral device 12 by submitting job requests. The peripheral device 12 performs operations responsive to the received job requests. Thereafter, the requesting host device 18 is disconnected from the peripheral device 12 which frees the services of the peripheral device 12 for usage by another host device 18. Accordingly, a plurality of different host devices 18 may couple with a given peripheral device 12 at different moments in time.

Peripheral devices 12 are arranged to monitor the performing of the job operations responsive to the job requests. For example, peripheral devices 12 are arranged to monitor usage of internal resources during the performing of the job operations, to count the number of job operations performed, etc. Peripheral devices 12 thereafter formulate and communicate messages regarding the performing of the job operations to monitoring device 16 for further processing.

Monitoring device 16 is arranged to communicate with individual peripheral devices 12 using network 14. In one embodiment, monitoring device 16 is implemented as a server arranged to implement embodiments of the invention described herein. Other configurations of monitoring device 16 are possible.

In addition to performing communications with peripheral devices 12, monitoring device 16 may be arranged to implement communications using network 14 or other appropriate medium with respect to entities associated with host devices 18. In one embodiment, monitoring device 16 is arranged to generate and communicate reports including information, such as usage information (e.g., number of pages printed, number of pages copied, number of compact disks written, corresponding billing information, etc.), corresponding to usage of peripheral device 12 by host devices 18. Monitoring device 16 may communicate the reports to appropriate recipients, such as entities associated with host devices 18 which have utilized the peripheral devices 12.

Monitoring device 16 may communicate the reports in a variety of methods or formats. For example, the information may be communicated in a plurality of different formats depending upon the type of recipients or destinations of the entities. In one arrangement, monitoring device 16 may formulate e-mails for communication to personal computers of the entities, such as host devices 18 directly. In another arrangement, the messages may be communicated to mail pre-process and transport servers for mailing. Such described communications are exemplary. Additional embodiments regarding communication of reports are described below.

Figure 2:
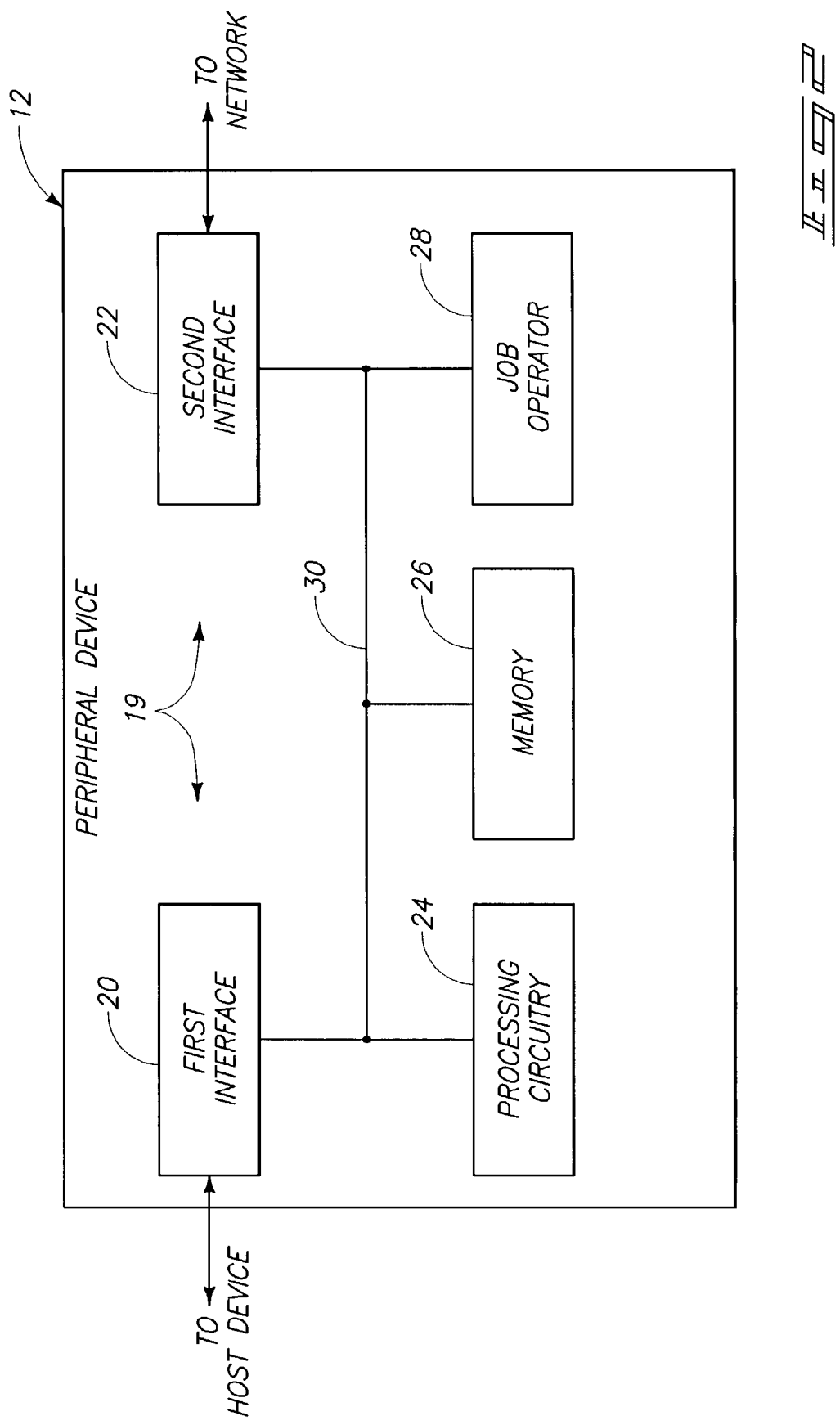
FIG. 2 is a functional block diagram of an exemplary peripheral device of the system of FIG. 1.

Referring to FIG. 2, an exemplary peripheral device 12 includes communications circuitry 19, processing circuitry 24, memory 26, and a job operator 28. A bus 30 is utilized in the exemplary arrangement to implement communications intermediate the components of peripheral device 12.

Communications circuitry 19 is arranged to implement communications intermediate peripheral device 12 and external devices, such as, host devices 18 and monitoring device 16. In the illustrated exemplary arrangement, circuitry 19 is implemented using first and second interfaces 20, 22 for communications with respective devices 18, 16. Other configurations of circuitry 19 are possible. For example, circuitry 19 may include a single interface to communicate with devices 16, 18. The interface may be configured to implement external communications using a common communications protocol (e.g., Internet Protocol) in such an exemplary configuration.

The first interface 20 is arranged to couple with and to communicate with a plurality of different host devices 18 at a plurality of different moments in time. In the depicted exemplary configuration, first interface 20 is arranged to implement bi-directional communications with respect to host devices 18. First interface 20 may be arranged in any appropriate configuration to implement communications with respective host devices 18. For example, first interface 20 may be an infrared port, universal serial bus (USB) port, serial port, parallel port, etc.

First interface 20 receives appropriate communications from host devices 18 including identifiers corresponding to respective host devices 18 and job requests to initiate performing of operations within peripheral device 12 for the host devices 18. Exemplary job requests from host devices 18 include, for example, print jobs using peripheral device 12, requests to write data to compact disks using peripheral device 12, requests to initiate scanning operations within peripheral device 12, requests to initiate copying operations within peripheral device 12, requests to implement facsimile operations using peripheral device 12, or other appropriate requests corresponding to the configuration and capabilities of job operator 28.

Second interface 22 is arranged to implement communications via network 14 including, for example, communications with network 14. In such an exemplary arrangement, second interface 22 may be embodied as a network interface card (NIC), modem or other appropriate structure for implementing bi-directional communications with respect to network 14. As mentioned above, the depicted arrangement of peripheral device 12 is exemplary and peripheral device 12 may include a single interface to implement communications with respect to host devices 18, network 14 or other external devices in other embodiments.

Processing circuitry 24 is arranged to utilize executable code to control operations of peripheral device 12. Exemplary processing circuitry 24 is embodied as a dedicated microcontroller to control operations. Executable code usable by processing circuitry 24 may be embodied as software or firmware. In one arrangement, executable code to configure processing circuitry 24 as an embedded web server (EWS) is provided. Embedded web server concepts are described in a U.S. Pat. No. 5,956,487, incorporated herein by reference. Such functionality enables processing circuitry 24 to communicate with monitoring device 16, to communicate with other networked devices, to serve up web pages, etc.

Memory 26 is arranged to store executable code, data or other digital information usable by peripheral device 12. Memory 26 may be embodied as random access memory (RAM), read only memory (ROM), flash memory, or another appropriate configuration for storage. Although not shown, mass storage devices, such as one or more disk drive, may also be utilized within peripheral device 12 for storage of digital information.

Job operator 28 may be implemented in a variety of different configurations corresponding to the given arrangement of peripheral device 12. For example, if peripheral device 12 is implemented as a printer, job operator 28 may include a print engine having a developing assembly and a fusing assembly to form hard images upon a media (not shown). In other arrangements, job operator 28 may be implemented as a scanning mechanism, a copying mechanism, an optical disk writing mechanism, and/or other appropriate configuration tailored to the specific configuration of peripheral device 12. Some peripheral devices 12 may individually include a job operator 28 including a plurality of the above-described or other implementations.

Exemplary operations of a peripheral device 12 are described hereafter according to some embodiments of the invention. During inactive modes, peripheral device 12 idles and waits for the presence of a host device 18. For example, processing circuitry 24 may periodically poll first interface 20 to monitor for the presence of a host device 18. Following detection of a host device 18, processing circuitry 24 may monitor for the reception of an identifier from the host device 18 and/or a respective job request to initiate the performing of operations within peripheral device 12 with respect to host device 18.

Identifiers are communicated from host devices 18 to peripheral devices 12. In one arrangement, identifiers comprise unique identifiers which identify the communicating host devices 18 (e.g., unique identifiers include internet protocol (IP) addresses of respective host devices 18). Other identifiers may be utilized to identify respective host devices 18 or groups of host devices 18 (e.g., associated with a common entity such as a corporation). For example, other identifiers include numbers which may be assigned to host devices 18 upon registration or subscription to services of system 10. In other embodiments, an identifier identifies a particular user or group of users.

In one exemplary arrangement wherein peripheral device 12 is implemented as a printer, job requests may be provided in the format of print jobs. In such an exemplary configuration, host devices 18 may be arranged to provide appropriate identifiers within header information of respective print jobs. Alternatively, identifiers of host devices 18 may be communicated apart from requests or apart from data associated with requests.

According to one aspect of the present invention, processing circuitry 24 may implement a verification operation of the communicating host device 18 responsive to receiving an identifier and a job request. For example, in one configuration, processing circuitry 24 may forward a communication to monitoring device 16 which includes the identifier of the requesting host device 18. In such a configuration, monitoring device 16 may access a database (illustrated in FIG. 3 as reference 38) to verify the host device 18. Monitoring device 16 may communicate an appropriate response to second interface 22 which is accessed by processing circuitry 24. The response may indicate whether the host device 18 is associated with an entity which subscribes to job services performed by peripheral devices 12 of system 10. Alternatively, peripheral device 12 may maintain a database, for example within a mass storage device, and perform internal verification operations to verify whether the entity of the host device 18 is a subscriber. According to exemplary embodiments of the invention, a database of subscribers may be provided internally or externally of peripheral device 12 or monitoring device 16 (e.g., implemented using a server of the Internet). Other verification operations are possible.

If the verification operation fails with respect to the given host device 18 (indicating that the communicating host device 18 is not a subscriber), the processing circuitry 24 is arranged to control peripheral device 12 to not perform or operate upon the job request received from host device 18. Processing circuitry 24 may implement an information gathering procedure wherein the entity associated with the communicating host device 18 may become a subscriber to the services and provide information for storage within a database which results in access to the services of peripheral device 12.

If the verification operation identifies the communicating host device 18 as being associated with an appropriate entity, processing circuitry 24 enables peripheral device 12 to proceed with the performing of operations using job operator 28 with respect to host device 18 as described herein.

According to additional embodiments of the invention, peripheral device 12 may provide job estimation information to host device 18 responsive to received job requests. For example, the processing circuitry 24 may analyze the job request and estimate associated costs to complete or perform the requested job. If the job request is in the form of a print job, processing circuitry 24 may analyze the number of pages, pixels or use other criteria to determine or estimate approximate costs for performing or completing the job. Alternatively, processing circuitry 24 may provide estimation information according to media copying operations, compact disk writing operations, scanning operations, faxing operations, etc.

Following calculation of the appropriate estimation, processing circuitry 24 may control first interface 20 to communicate the estimation to the respective host device 18. Thereafter, the processing circuitry 24 awaits a response from the host device 18 indicating whether to proceed with performing of the job operation or whether the operation is to be canceled. If the estimation is accepted, processing circuitry 24 enables job operator 28 and other appropriate components of peripheral device 12 to perform operations with respect to the job request.

As mentioned previously, processing circuitry 24 is arranged to monitor the performing of the job operations upon job requests for host devices 18. For example, in the exemplary peripheral device 12 implemented as a printer embodiment, processing circuitry 24 may monitor the number of pages printed using job operator 28. In other configurations, processing circuitry 24 may monitor the number of compact disks written to, a number of pages transmitted by facsimile, a number of sheets copied, a number of sheets scanned, etc.

In addition, processing circuitry 24 is arranged to formulate a plurality of messages relative to the performing of the operations: by peripheral device 12. The generated messages are provided in a format for appropriate communication to monitoring device 16. Processing circuitry 24 is arranged to associate identifiers of host devices 18 with or within the messages. Following appropriate generation of the messages, processing circuitry 24 is arranged to control second interface 22 to communicate the identifiers and the messages to monitoring device 16. In one arrangement, processing circuitry 24 controls second interface 22 to communicate the messages directly to monitoring device 16 using network 14.

Processing circuitry 24 is arranged in one exemplary embodiment to control second interface 22 to communicate messages and respective identifiers after performing the operations for the host devices 18 responsive to the job requests. In one embodiment, second interface 22 is controlled to communicate messages and respective identifiers responsive to completion of the performing of the operations for the host devices 18.

Figure 3:
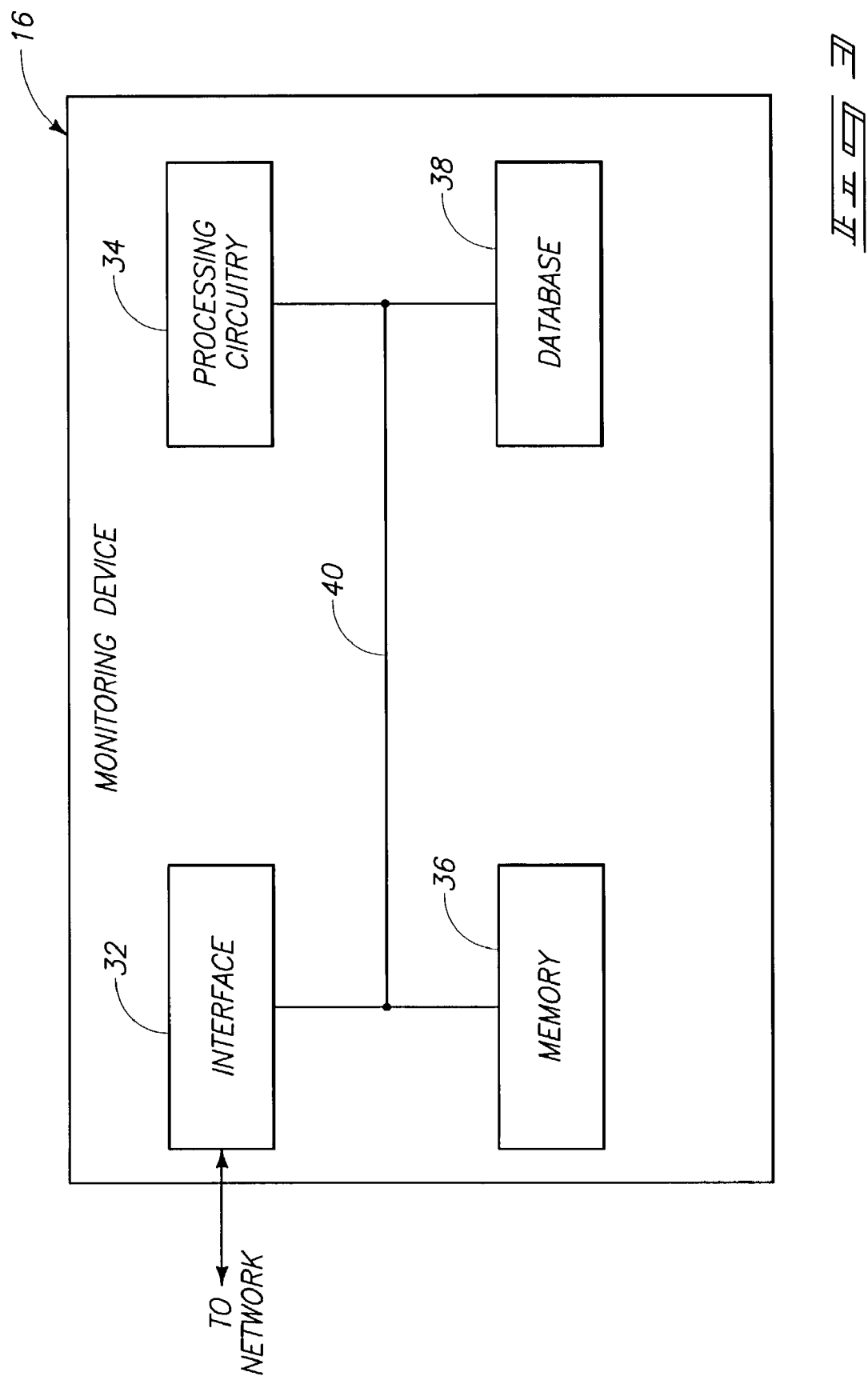
FIG. 3 is a functional block diagram of an exemplary monitoring device of the system of FIG. 1.

Referring to FIG. 3, an exemplary configuration of monitoring device 16 is illustrated according to one embodiment of the invention. The depicted exemplary monitoring device 16 may be implemented as a server as mentioned above although other configurations may be utilized. The depicted exemplary monitoring device 16 includes an interface 32, processing circuitry 34, memory 36 and a database 38. A bus 40 is also provided to implement communications between the respective components of monitoring device 16.

Interface 32 is arranged to implement bi-directional communications with respect to network 14 and other appropriate external media. Interface 32 may be embodied as a network interface card, modem or other device.

Processing circuitry 34 may be implemented as a microprocessor, for example, available from Intel Corporation, Motorola, Inc., Advanced Micro Devices, Inc., etc. Processing circuitry 34 is arranged to utilize executable code embodied as software or firmware in exemplary configurations to implement operations described herein.

Memory 36 may include RAM, ROM, and/or other appropriate devices for storing data, executable code or other digital information.

As mentioned above, database 38 is arranged to store information regarding entities associated with respective host devices 18. In such an arrangement, the associated entities may subscribe to the services of system 10. Entities of host devices 18 may be added upon requesting of job services of peripheral devices 12 if they have not previously subscribed. Subscribers may also be deactivated or suspended if, for example, account balances are past due or for other reasons.

As mentioned above, embodiments of the invention provide verification operations. Processing circuitry 34 may access database 38 and compare received identifiers with respect to information within database 38 in order to determine whether an entity associated with a requesting host device 18 is a valid subscriber. Appropriate responses are formulated using processing circuitry 34 which controls interface 32 to communicate replies to the communicating peripheral device 12.

Estimation operations performed by peripheral device 12 were described above according to additional embodiments of the invention. Estimation operations may be performed within monitoring device 16 according to alternative arrangements. For example, peripheral device 12 may forward received job requests to monitoring device 16 which may formulate appropriate job estimations for communication to host devices 18.

According to embodiments of the invention, monitoring device 16 is arranged to prepare and/or to communicate reports corresponding to the performing of job operations by peripheral device 12 with respect to one or more host device 18. Using identifiers provided by host devices 18, monitoring device 16 may utilize database 38 to identify appropriate entities associated with host devices 18. Processing circuitry 34 may compile and process received messages from peripheral devices 12 with respect to host devices 18 to generate reports for the appropriate entities. Exemplary reports include billing information and/or usage information regarding usage of the services, and/or usage of consumables (e.g., toner) of peripheral device 12 by host devices 18. The billing information and usage information may indicate the services performed by peripheral device 12 in numerous ways including, for example, number of pages printed, number of pages copied, number of pages communicated via facsimile, number of compact disks written to, etc. Reports may be generated on a per job basis, corresponding to predefined periods of time (e.g., monthly, biannually, annually, or other basis), or according to other protocols.

Embodiments of the invention provide communication of the reports from monitoring device 16 to appropriate recipients. The reports may be communicated to entities associated with host devices 18, for example, using received identifiers. As mentioned above, exemplary identifiers for host devices 18 include network addresses, such as IP addresses. In one embodiment, processing circuitry 34 is arranged to generate the reports and communicate the reports to entities using the IP addresses. In such an arrangement, the monitoring device 16 would communicate reports to the respective host devices 18 initiating the performing of operations or services within the peripheral devices 12. Reports may also be communicated to other destinations as desired.

Exemplary reports may be presented in invoice formats indicating billing information associated with a requested job, corresponding to a plurality of jobs over a given period of time, or according to other criteria. Alternatively, or in addition to billing information, reports may include usage information indicating number of pages copied, pages printed, pages faxed, number of compact disks written to, or otherwise indicate the services performed.

According to other arrangements, database 38 of monitoring device 16 may include credit card information, other account information, internal location codes, or other information corresponding to entities associated with host devices 18. In the alternative, or in addition to preparing invoices or other reports, monitoring device 16 may charge appropriate accounts corresponding to the usage of peripheral devices 12. In such arrangements, monitoring device 16 may generate reports indicating charges to the accounts and the usage of the peripheral devices 12 by the host devices 18. The generated reports may identify host devices 18 and/or the appropriate peripheral devices 12.

As indicated herein, system 10 may be utilized in applications wherein monitoring of one or more peripheral device 12 is desired. Embodiments of the invention have been described above with respect to one possible exemplary implementation. In another arrangement, system 10 may be implemented within a company or other association to monitor usage of peripheral devices 12 by a plurality of workstations and to provide the generation of reports to an accounting department or other appropriate monitoring facility to indicate usage of the peripheral devices 12 by the respective workstations.

Referring to FIG. 4, an exemplary operational method executable by processing circuitry 24 of peripheral device 12 to implement embodiments of the invention is illustrated. The depicted methodology may be embodied as executable code within memory 26. The methodology is presented to illustrate exemplary steps for performing embodiments of the invention. Other methods are possible including more, less or alternative steps.

The processing circuitry at a step S10 detects the presence of a host device wishing to access services of the peripheral device.

At a step S12, the processing circuitry receives and accesses a job request and a respective identifier from the host device.

At a step S14, the processing circuitry verifies the identity of the host device requesting the services. For example, the processing circuitry may forward the identifier to the monitoring device and await a response indicating whether the host is verified. Alternatively, the peripheral device may include an internal database of appropriate host devices and the processing circuitry may verify the requesting host device using the database.

If the condition of step S14 is negative, the processing circuitry may proceed to a step S15 to communicate an appropriate termination message to host device and end the current execution of the methodology. The message may request the entity of the host device to become a subscriber.

If the condition of step S14 is affirmative, the processing circuitry proceeds to a step S16 to calculate a job estimation based upon the received job request.

At a step S18, the processing circuitry communicates the job estimation to the host device requesting the services.

At a step S20, the processing circuitry awaits a response indicating acceptance of the job estimation.

If the condition of step S20 is negative, the processing circuitry may communicate an appropriate termination message at step S15 and end the current execution of the methodology.

If the condition of step S20 is affirmative, the processing circuitry may proceed to a step S22 to process the requested job.

At a step S24, the processing circuitry calculates a job fee associated with the processing of the respective job.

At a step S26, the processing circuitry communicates the job fee and a respective identifier of the host device to the monitoring device for further processing and/or generation of an invoice or other report.

Thereafter, the method of FIG. 4 may terminate.

Referring to FIG. 5, an exemplary operational method executable by processing circuitry 34 of monitoring device 16 to implement embodiments of the invention is illustrated. The depicted methodology may be embodied as executable code within memory 36. The methodology is presented to illustrate exemplary steps for performing embodiments of the invention. Other methods are possible including more, less or alternative steps.

The processing circuitry initially receives a verification request at a step S30 corresponding to the above described step S14 of FIG. 4.

At a step S32, the monitoring device analyzes the received request including, for example, comparing the identifier of the requesting host device with respect to a database.

At a step S34, the processing circuitry determines whether the host is verified.

If not, the processing circuitry proceeds to a step S36 to communicate a rejection to the peripheral device for communication to the host device in step S15 of FIG. 4. The rejection may include a request for appropriate billing information to set up a new subscriber account.

If the condition of step S34 is affirmative, the processing circuitry proceeds to a step S38 to monitor for the reception of the job fee and identifier communicated from the peripheral device in step S26 of FIG. 4.

At a step S40, the processing circuitry associates the received job fee with an entity corresponding to the identifier, At a step S42, the processing circuitry generates and communicates an appropriate report to the entity corresponding to the respective identifier.

The methodology of FIG. 5 may terminate following the execution of step S36 or step S42.

The protection sought is not to be limited to the disclosed embodiments, which are given by way of example only, but instead is to be limited only by the scope of the appended claims. For example, in some embodiments the host devices 18, the peripheral device 12, and the monitoring devices 16 are all coupled to a common network, such as the Internet. Additionally, some of the functions that are described as being performed by the peripheral device 12 may be performed by the monitoring device 16 or visa versa. For example, the job estimation function described above as being performed by the peripheral device may alternatively be performed by the monitoring device.

What is claimed is:

1. A peripheral device configured to perform job operations with respect to a plurality of host devices, the peripheral device comprising:

communications circuitry adapted to couple with a plurality of different host devices at a plurality of different moments in time, to receive a plurality of different identifiers of the respective host devices, and to receive a plurality of job requests to initiate performing of job operations with respect to the host devices, wherein the communications circuitry is further adapted to couple with a monitoring device;

a job operator configured to perform the job operations; and processing circuitry configured to monitor the performing of the job operations with respect to the host devices using the job operator, to formulate a plurality of messages relative to the performing the job operations using the job operator, to associate the identifiers with the respective messages corresponding to the respective host devices, and to control the communications circuitry to communicate the identifiers and the respective messages to the monitoring device for preparation of a plurality of reports to indicate information associated with the performing the job operations and communication of the reports to a plurality of entities associated with respective ones of the hosst devices.

2. The device of claim 1 wherein the identifiers comprise network addresses of the host devices.

3. The device of claim 1 wherein the processing circuitry is configured to include the identifiers within the messages.

4. The device of claim 1 wherein the processing circuitry is configured to implement the performing the job operations responsive to a verification of the host devices.

5. The device of claim 1 wherein the processing circuitry is configured to communicate a plurality of job estimations to the respective host devices responsive to the received job requests.

6. The device of claim 1 wherein the processing circuitry is configured to control the communications circuitry to communicate the messages directly to the monitoring device.

7. The device of claim 1 wherein the processing circuitry is configured to control the communications circuitry to communicate the identifiers and the messages to the monitoring device for preparation of the reports comprising invoices for the performing the operations.

8. The device of claim 1 wherein the processing circuitry is configured to control the communications circuitry to communicate one of the identifiers and one of the messages for a respective one of the host devices after the performing the job operation for the one host device.

9. The device of claim 1 wherein the processing circuitry is configured to control the communications circuitry to communicate one of the identifiers and one of the messages for a respective one of the host devices responsive to completion of the performing the job operation for the one host device.

10. The device of claim 1 wherein the job operator comprises a print engine of the peripheral device, wherein the job requests comprise print jobs, and wherein the print jobs include the identifiers.

11. The device of claim 1 wherein the communications circuitry comprises a plurality of interfaces.

12. A peripheral device comprising:
communication means for coupling with a plurality of different host devices at a plurality of different moments in time, to receive a plurality of different identifiers of the respective host devices, and to receive a plurality of job requests, wherein the communication means further comprises means for coupling with a monitoring device;
job operator means for performing a plurality of job operations with respect to the host devices responsive to the job requests; and
processing means for monitoring the job operator means, for formulating a plurality of messages relative to the performing of the job operations, for associating the identifiers with the respective messages corresponding to the respective host devices, and for controlling the communication means to communicate the identifiers and the messages to the monitoring device for preparation of a plurality of reports to indicate usage information associated with the performing the job operations and communication of the reports to a plurality of entities associated with respective ones of the host devices.

13. The device of claim 12 wherein the identifiers comprise network addresses of the host devices.

14. The device of claim 12 wherein the peripheral device comprises a printer, and the communication means is configured to receive the identifiers comprising network addresses of the host devices within headers of the job requests comprising print jobs.

15. The device of claim 12 wherein the processing means is configured to implement the performing the job operations responsive to a verification of the host devices.

16. The device of claim 12 wherein the processing means is configured to control the communication means to communicate a plurality of job estimations to the respective host devices responsive to the received job requests, and the job operator means is configured to perform the job operations responsive to acceptance of the job estimations.

17. The device of claim 12 wherein the processing means is configured to control the communication means to communicate one of the identifiers and one of the messages for a respective one of the host devices responsive to completion of the performing the job operation for the one host device.

18. The device of claim 12 wherein the communication means comprises a plurality of interfaces.

19. A system for providing job operations to a plurality of host devices comprising:
a plurality of peripheral devices individually configured to couple with a plurality of host devices at a plurality of different moments in time, to receive a plurality of identifiers of the respective host devices, to perform job operations with respect to the host devices, and to communicate a plurality of messages regarding the performing the job operations and identifying the host devices; and
a monitoring device coupled with the peripheral devices and configured to receive the messages regarding the performing the job operations and identifying the host devices, to associate the messages with a plurality of entities associated with respective ones of the host devices, and to communicate a plurality of respective reports regarding the performing the job operations with respect to the host devices.

20. The system of claim 19 wherein the identifiers comprise network addresses of the host devices.

21. The system of claim 19 wherein the monitoring device is configured to communicate the reports comprising billing information to the entities associated with the host devices.

22. The system of claim 19 wherein the monitoring device is configured to communicate the reports to the entities using the identifiers comprising network addresses of the host devices.

23. The system of claim 19 wherein at least one of the monitoring device and the peripheral devices is configured to verify the host devices prior to the performing the job operations with respect to the host devices.

24. The system of claim 19 wherein the peripheral devices are configured to communicate job estimations to the host devices, to receive acceptances of the job estimations, and to perform the job operations with respect to the host devices responsive to the acceptances.

25. The system of claim 19 wherein the peripheral devices are configured to communicate the messages after the performing the operations.

26. The system of claim 19 wherein the peripheral devices are configured to communicate the messages responsive to the completion of the performing the operations.

27. The system of claim 19 wherein the peripheral devices comprise printers.

28. A peripheral device monitoring method comprising:
interfacing a plurality of different host devices with a peripheral device at a plurality of different moments in time;
receiving, by the peripheral device, a plurality of job requests from the host devices;
receiving, by the peripheral device, a plurality of identifiers from the host devices;
performing, by the peripheral device, a plurality of job operations in response to the job requests; and communicating, by the peripheral device, a plurality of messages regarding the job operations and the identifiers to a monitoring device; and associating, by the monitoring device, the messages with a plurality of entities of the respective host devices.

29. The method of claim 28 wherein the identifiers comprise network addresses of the host devices.

30. The method of claim 28 wherein the performing the job operations comprising printing a plurality of print jobs using the peripheral device comprising a printer, and wherein the communicating the messages comprising communicating using the printer.

31. The method of claim 28 further comprising associating, by the monitoring device, job usage information associated with the job operations with the plurality of entities.

32. The method of claim 28 further comprising communicating reports regarding the performing to the plurality of entities using the monitoring device.

33. The method of claim 32 wherein the communicating the reports comprises addressing the reports using the identifiers.

34. The method of claim 28 further comprising verifying the host devices prior to the performing.

35. The method of claim 28 further comprising:
providing job estimations for the performing the job operations to the host devices; and
receiving acceptances of the job estimations from the host devices, and wherein the performing is responsive to the receiving the acceptances.

36. The method of claim 28 wherein the communicating comprises communicating after the performing.

37. The method of claim 28 wherein the communicating comprises communicating one of the messages for one of the host devices responsive to completion of the performing the job operation with respect to the one host device.

38. The method of claim 28 wherein the performing comprises printing a plurality of print jobs.

39. The device of claim 1 wherein the peripheral device is a printer, and the communications circuitry, the job operator and the processing circuitry are components of the printer, and wherein the job operator is a print engine configured to print hard images upon media.

40. The device of claim 39 further comprising a single housing configured to house the communications circuitry, the print engine, and the processing circuitry of the printer.

41. The device of claim 1 further comprising a single housing configured to house the communications circuitry, the job operator, and the processing circuitry of the peripheral device.

42. The device of claim 1 wherein the peripheral device is a printer and the processing circuitry of the printer is configured to control the communications circuitry of the printer to output one of the identifiers and one of the messages for a respective one of the host devices after the performing the job operation for the one host devices after the comprising printing a print job received from the host device.

43. The system of claim 19 wherein the plurality of peripheral devices Individually comprise a printer.

44. The system of claim 43 wherein the printers are configured to perform the job operations with respect to the host devices comprising printing print jobs Of the host devices.

45. The method of claim 28 wherein the receivings, the performing and the communicating comprise receivings, performing and communicating by the peripheral device comprising a printer.

* * * * *

UNITED STATES PATENT AND TRADEMARK OFFICE
CERTIFICATE OF CORRECTION

PATENT NO. : 7,447,764 B2 Page 1 of 1
APPLICATION NO. : 10/260781
DATED : November 4, 2008
INVENTOR(S) : Gustavo Guillemin It is certified that error appears in the above-identified patent and that said Letters Patent is hereby corrected as shown below:

In column 10, line 67, in Claim 1, delete "hosst" and insert -- host --, therefor.

In column 12, line 67, in Claim 28, after "requests;" delete "and".

In column 13, line 9, in Claim 30, delete "comprising" and insert -- comprises --, therefor.

In column 13, line 11, in Claim 30, delete "comprising" and insert -- comprises --, therefor.

In column 14, line 22, in Claim 42, delete "devices after the" and insert -- device --, therefor.

In column 14, line 25, in Claim 43, delete "Individually" and insert -- individually --, therefor, In column 14, line 28, in Claim 44, delete "Of" and insert -- of --, therefor.

Signed and Sealed this

Thirty-first Day of March, 2009

JOHN DOLL
*Acting Director of the United States Patent and Trademark Office*